United States Patent
Mullen et al.

(10) Patent No.: US 8,249,957 B2
(45) Date of Patent: Aug. 21, 2012

(54) SYSTEM AND METHOD FOR DATA COMPLETION INCLUDING PUSH IDENTIFIER

(75) Inventors: Matthew Mullen, Danville, CA (US); Mark Rockelman, San Mateo, CA (US); Barbara Patterson, South San Francisco, CA (US)

(73) Assignee: Visa U.S.A., San Francisco, CA (US)

( * ) Notice: Subject to any disclaimer, the term of this patent is extended or adjusted under 35 U.S.C. 154(b) by 439 days.

(21) Appl. No.: 12/352,711

(22) Filed: Jan. 13, 2009

(65) Prior Publication Data

US 2009/0182654 A1  Jul. 16, 2009

Related U.S. Application Data

(60) Provisional application No. 61/021,289, filed on Jan. 15, 2008.

(51) Int. Cl.
*G07B 17/00* (2006.01)
*G06Q 40/00* (2006.01)

(52) U.S. Cl. ............... 705/30; 705/35; 705/39; 902/4

(58) Field of Classification Search ............ 705/39, 705/42, 44, 64, 40; 713/202
See application file for complete search history.

(56) References Cited

U.S. PATENT DOCUMENTS

| | | |
|---|---|---|
| 4,341,951 A | 7/1982 | Benton |
| 4,755,872 A | 7/1988 | Bestler et al. |
| 5,008,930 A | 4/1991 | Gawrys et al. |
| 5,023,904 A | 6/1991 | Kaplan et al. |
| 5,220,501 A | 6/1993 | Lawlor et al. |
| 5,383,113 A | 1/1995 | Kight et al. |
| 5,485,510 A | 1/1996 | Colbert |
| 5,591,949 A | 1/1997 | Bernstein |
| 5,729,460 A | 3/1998 | Plett et al. |
| 5,778,313 A | 7/1998 | Fougnies |
| 5,787,159 A | 7/1998 | Hamilton et al. |
| 5,937,396 A | 8/1999 | Konya |
| 5,945,652 A | 8/1999 | Ohki et al. |
| 5,991,748 A | 11/1999 | Taskett |
| 5,991,749 A | 11/1999 | Morrill, Jr. |
| RE36,788 E | 7/2000 | Mansuelt et al. |
| 6,169,974 B1 | 1/2001 | Baumgartner et al. |
| 6,173,272 B1 * | 1/2001 | Thomas et al. ............... 705/42 |
| 6,295,522 B1 | 9/2001 | Boesch |
| 6,418,420 B1 | 7/2002 | DiGiorgio et al. |
| 6,439,456 B1 | 8/2002 | Bansal et al. |

(Continued)

FOREIGN PATENT DOCUMENTS

WO  WO 96/13814 A1  5/1996

(Continued)

OTHER PUBLICATIONS

U.S. Appl. No. 12/576,463, filed Oct. 9, 2009, O'Leary et al.

(Continued)

*Primary Examiner* — Matthew Gart
*Assistant Examiner* — Reva R Danzig
(74) *Attorney, Agent, or Firm* — Kilpatrick Townsend & Stockton LLP

(57) ABSTRACT

A system and method for processing push transactions. A payor may initiate a transaction without input from the payee. A system can determine who the payee is from partial information provided by the payor, and direct the transaction to the proper party.

21 Claims, 5 Drawing Sheets

U.S. PATENT DOCUMENTS

| | | | |
|---|---|---|---|
| 6,609,113 | B1 | 8/2003 | O'Leary et al. |
| 6,612,487 | B2 | 9/2003 | Tidball et al. |
| 6,704,714 | B1 | 3/2004 | O'Leary et al. |
| 6,769,605 | B1 | 8/2004 | Magness |
| 6,847,953 | B2 | 1/2005 | Kuo |
| 6,868,391 | B1 | 3/2005 | Hultgren |
| 7,003,493 | B2 | 2/2006 | Weichert et al. |
| 7,089,208 | B1 | 8/2006 | Levchin et al. |
| 7,207,479 | B2 | 4/2007 | Moreau, Jr. et al. |
| RE39,736 | E | 7/2007 | Morrill et al. |
| 7,251,656 | B2 | 7/2007 | Keown et al. |
| 7,415,442 | B1 | 8/2008 | Battaglini et al. |
| 7,454,232 | B2 | 11/2008 | Abuhamdeh |
| 7,606,787 | B2 | 10/2009 | Keown et al. |
| 2002/0029193 | A1* | 3/2002 | Ranjan et al. .................... 705/39 |
| 2002/0077978 | A1 | 6/2002 | O'Leary et al. |
| 2002/0091945 | A1* | 7/2002 | Ross .............................. 713/202 |
| 2002/0128967 | A1 | 9/2002 | Meyer et al. |
| 2002/0128981 | A1 | 9/2002 | Kawan et al. |
| 2002/0152168 | A1 | 10/2002 | Neofytides et al. |
| 2002/0174016 | A1 | 11/2002 | Cuervo |
| 2003/0055756 | A1 | 3/2003 | Allan |
| 2003/0061162 | A1 | 3/2003 | Matthews |
| 2003/0105710 | A1 | 6/2003 | Barbara et al. |
| 2003/0120608 | A1 | 6/2003 | Pereyra |
| 2003/0126094 | A1 | 7/2003 | Fisher et al. |
| 2003/0130940 | A1 | 7/2003 | Hansen et al. |
| 2003/0140004 | A1 | 7/2003 | O'Leary et al. |
| 2003/0144935 | A1 | 7/2003 | Sobek |
| 2003/0212642 | A1* | 11/2003 | Weller et al. ..................... 705/67 |
| 2004/0039693 | A1 | 2/2004 | Nauman et al. |
| 2004/0049455 | A1 | 3/2004 | Mohsenzadeh |
| 2004/0078328 | A1 | 4/2004 | Talbert et al. |
| 2004/0188515 | A1 | 9/2004 | Jimenez |
| 2004/0210520 | A1* | 10/2004 | Fitzgerald et al. .............. 705/40 |
| 2004/0230527 | A1 | 11/2004 | Hansen et al. |
| 2004/0230539 | A1 | 11/2004 | Praisner |
| 2004/0236681 | A1* | 11/2004 | Modigliani et al. ............ 705/39 |
| 2005/0080697 | A1 | 4/2005 | Foss et al. |
| 2005/0080728 | A1 | 4/2005 | Sobek |
| 2005/0119978 | A1 | 6/2005 | Ates |
| 2005/0177510 | A1* | 8/2005 | Hilt et al. ........................ 705/40 |
| 2005/0209958 | A1 | 9/2005 | Michelsen et al. |
| 2006/0218086 | A1* | 9/2006 | Campbell et al. ............... 705/39 |
| 2006/0273155 | A1 | 12/2006 | Thackston |
| 2007/0045401 | A1 | 3/2007 | Sturm |
| 2007/0057043 | A1 | 3/2007 | de la Garza et al. |
| 2007/0094132 | A1 | 4/2007 | Watersin et al. |
| 2007/0100770 | A1 | 5/2007 | Grinberg et al. |
| 2007/0282743 | A1 | 12/2007 | Lovelett et al. |
| 2007/0294182 | A1* | 12/2007 | Hammad ........................ 705/64 |
| 2008/0010204 | A1 | 1/2008 | Rackley et al. |
| 2008/0033877 | A1 | 2/2008 | Blair et al. |
| 2008/0120231 | A1 | 5/2008 | Megwa |
| 2008/0133408 | A1 | 6/2008 | Nakfoor |
| 2008/0154772 | A1* | 6/2008 | Carlson ........................... 705/44 |
| 2008/0172344 | A1 | 7/2008 | Eager et al. |
| 2009/0072020 | A1 | 3/2009 | Hull |
| 2009/0089211 | A1 | 4/2009 | Morse |
| 2009/0106152 | A1 | 4/2009 | Dill et al. |
| 2009/0171845 | A1 | 7/2009 | Powell |
| 2009/0182654 | A1 | 7/2009 | Mullen et al. |
| 2009/0198615 | A1 | 8/2009 | Emerson et al. |
| 2009/0240626 | A1 | 9/2009 | Hasson et al. |

FOREIGN PATENT DOCUMENTS

| | | |
|---|---|---|
| WO | WO 98/47116 A1 | 10/1998 |
| WO | WO 00/04515 A1 | 1/2000 |
| WO | WO 00/30051 A1 | 5/2000 |
| WO | WO 00/67219 A1 | 11/2000 |
| WO | WO 02/063432 A2 | 8/2002 |
| WO | WO 03/073389 A2 | 9/2003 |
| WO | WO 2004/114168 A1 | 12/2004 |
| WO | WO 2007/144708 A1 | 12/2007 |
| WO | WO 2009/051937 A1 | 4/2009 |
| WO | WO 2009/085387 A1 | 7/2009 |
| WO | WO 2009/088372 A1 | 7/2009 |

OTHER PUBLICATIONS

U.S. Appl. No. 12/584,704, filed Sep. 9, 2009, Ates.
U.S. Appl. No. 12/510,149, filed Jul. 27, 2009, Eager at al.
"MasterCard: Payment Gateway"; https://www.mastercardpaymentgateway.com/mpgpublic/faq.do, retrieved on Jan. 21, 2010, 10 pages.
"Azerigazbank Open Joint Stock Company" <http://www.azerigazbank.com/eng/cardtocard.php>.
"Card to Card Money Transfer" <http://www.idbibank.com/products/cardtocard.asp>.
"Card Uses :: Prestige Gold Card" <http://prestigecard.cc/cardUses.html>.
"Maybank and Visa Launch Card-to-Card and Account-to-Card Payments in Singapore with Visa Money Transfer" <http://www.pata.org/patasite/fileadmin/whatsnew/2007/NR_Visa_Maybank_VMT_Launch_FINAL.PDF>.
"Services" <http://www.arca.am/sentices.php-en>.
"SmartMetric (TM)" <http://www.smartmetric.com/money/money.html>.
Examination Report mailed May 28, 2012 in GB Application No. GB1011864.4, 6 pages.

* cited by examiner

SYSTEM AND METHOD FOR DATA COMPLETION INCLUDING PUSH IDENTIFIER

CROSS-REFERENCES TO RELATED APPLICATIONS

This application is a non-provisional of and claims the benefit of U.S. Patent Application No. 61/021,289, filed on Jan. 15, 2008, which is herein incorporated by reference in its entirety for all purposes.

BACKGROUND

A number of payment methods and systems exist. For example, a buyer may present a credit card to a merchant, who can "swipe" the credit card and receive payment from a bank associated with the credit card. This method has many advantages, including enhanced fraud detection and security. However, the credit card (or the card number and security codes) must first be presented to the merchant before transaction processing can occur. Thus, the merchant and any merchant-related banks must be involved in a transaction from the beginning, even when such transaction is not completed. Furthermore, the buyer cannot easily schedule when the payments will be transferred to the merchant.

Other payment methods exist, such as checks, the use of automated clearing house (ACH) systems, wire transfers, etc. These methods are advantageous in that the merchant does not need to be involved in the processing of the transaction, as with a credit card transaction. However, the transaction methods are limited. For example, they do not provide for enhanced risk assessment or rewards programs for the buyer or merchant. Wire transfers can be troublesome to execute, and the timing and amounts transferable are limited. Checks may take a while to be cashed by the recipient. During such time, the buyer will not be able to know the status of the check, or when the funds will be drawn from the buyer's account. Furthermore, there are the inherent dangers of lost or stolen checks.

Embodiments of the invention address the above-noted problems, and other problems, individually and collectively.

BRIEF SUMMARY

Embodiments of the invention include systems and methods for performing a push transaction wherein a payor can initiate payments to a payee, with little to know interaction from the payee.

One embodiment is directed to a computer implemented method for conducting a transaction. The method comprises receiving a payment instruction message at a server computer, wherein the payment instruction message is for making a payment to a payee using an account associated with an issuer, wherein the payment instruction message contains at least partial payee information and further wherein the payment instruction message is originated by an entity different from the payee, reviewing the payment instruction message, determining substantially complete payee information, and sending an authorization request message to the issuer after reviewing the payment instruction message, wherein the authorization request includes a push identifier.

Another embodiment is directed to a computer implemented method of making a payment. The method comprises sending a payment instruction message including at least partial payee information, transaction amount, and time of payment to a server computer, wherein the payment instruction message is parsed by the server computer to determine substantially complete payee information and an authorization log is sent to an acquirer associated with the payee, and transferring funds to the payee.

Another embodiment is directed to a computer implemented method for receiving a push payment transaction. The method comprises receiving an authorization log relating to a transaction, wherein the authorization log includes a reporting systems file and a settlement file, sending a message regarding funds flow for the transaction, receiving funds relating to the transaction, remitting the funds to a payee, and sending transaction information to the payee.

Another embodiment is directed to a computer readable medium for conducting push transactions. The medium comprises code for receiving a payment instruction message for making a payment using an account associated with an issuer, wherein the payment instruction contains at least partial payee information and further wherein the payment instruction message is originated by an entity different from the payee, code for reviewing the payment instruction message, code for determining substantially complete payee information, and code for sending an authorization request to the issuer, wherein the authorization request includes a push identifier.

Another embodiment of the invention is directed to a computer readable medium for identifying a payee in a transaction. The medium comprises code for receiving a payment instruction message code for reviewing the payment instruction message and determining if the payment instruction message contains information to determine a payee, and code for using fuzzy logic matching to compare the information in the payment instruction message to multiple data stores to substantially identify a payee associated with the payment instruction, wherein the multiple data stores include a plurality of identifiers for at least one merchant, wherein the plurality of identifiers includes an identifier for a name, an identifier for a phone number, and an identifier for an address.

These and other embodiments of the invention are described in further detail below with reference to the drawings and the Detailed Description.

DETAILED DESCRIPTION

Figure 1:
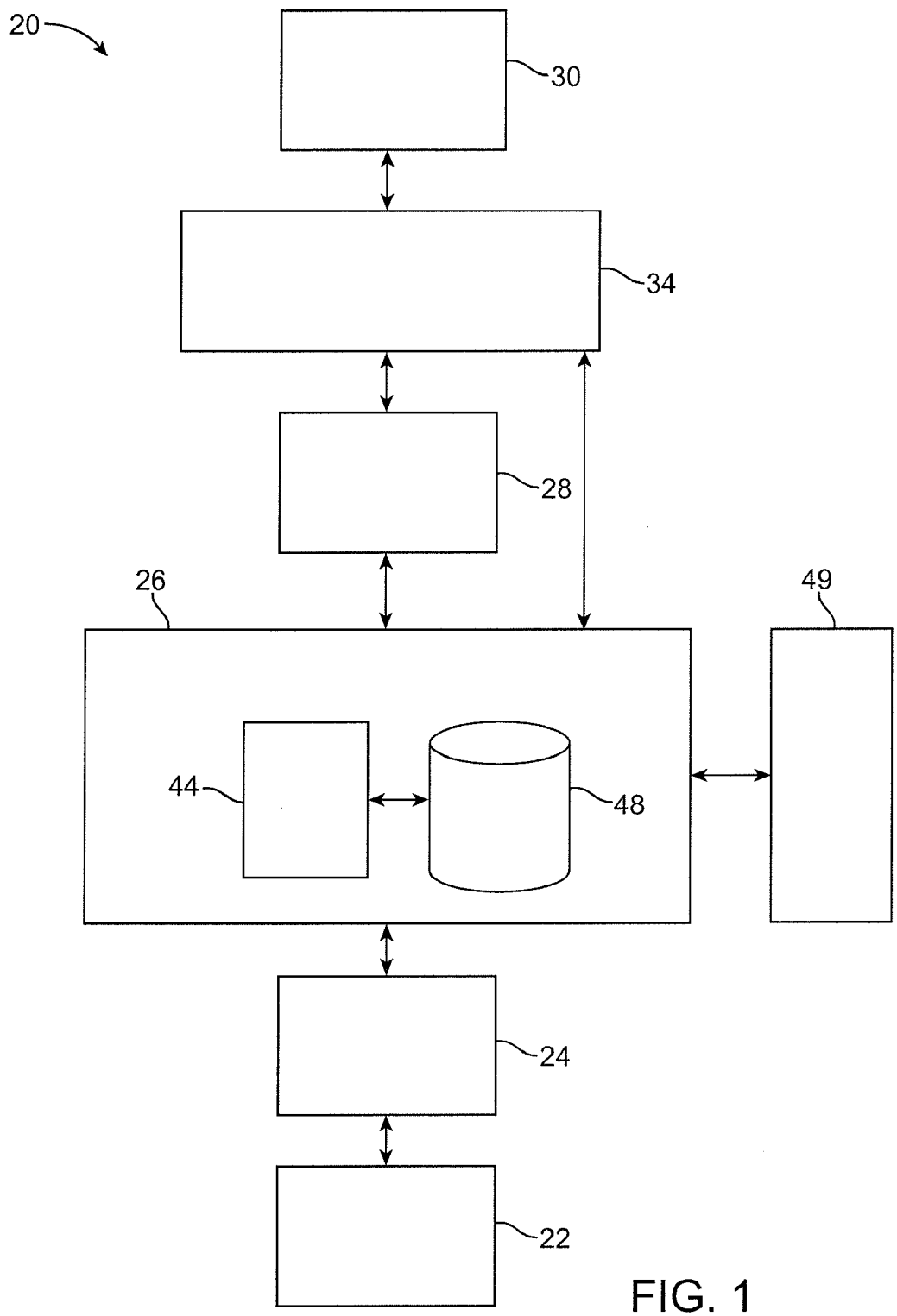
FIG. 1 is a block diagram of a system according to an embodiment of the invention.

Embodiments of the invention are directed towards systems and methods of payment transactions initiated by the party that is making the payment. In other words, transactions that are "pushed" from the payor, rather than "pulled" from the payee. In certain embodiments, a first party (such as a buyer in the transaction) can use standard credit card processing systems to transfer payment funds to a second party (such as a seller) without any interaction with the second party. The second party can receive a notification that a payment has been made by the first party, and that the associated funds have been deposited in the second party's account.

Embodiments of the invention can be used by companies in making payments to other entities. For example a buyer may purchase goods from a supplier. In one such example, a restaurant company may purchase napkins in bulk from a napkin supplier. The buyer may receive an invoice for the goods. In a conventional process, the buyer may pay the invoice by check sent to the supplier. However, payment by checks suffers from limitations as described above. In certain embodiments of the invention, the buyer can instead make a push payment to pay the invoice. The buyer can prepare a payment instruction message. Embodiments contemplate that the payment instruction message can be sent electronically to the buyer's bank (an "issuer") or to a payment processing network, such as VisaNet™ or Banknet™.

The payment instruction message can contain certain information, such as the name of the supplier, how much to pay, when to make the payment, etc. The payment processing network can use the information in the payment instruction message to determine the proper entity to supply the payment to. For example, some payment instruction messages may contain only partial payee information, such as only a portion of the supplier name or address. In the above example, the napkin supplier may be "The Napkin Company." However, the restaurant company may only refer to it as "Napkin Co." The payment processing network can then determine, based on the supplied information, the substantially complete payee information. This can be done by fuzzy logic matching, comparing the partial information to databases of listings of suppliers, and other techniques according to embodiments of the invention, as will be described in further detail below. In this manner, the payment processing network can determine that the proper payee is "The Napkin Company."

Once the complete payee information of the supplier has been determined, the payment processing network can create a message to request payment from the issuer (an "authorization request message"). In some embodiments, the authorization request message can comport with any of certain standard message systems (i.e., the payment processing system translates the payment instruction message to an industry standard format). On other embodiments, the authorization request message can be a unique format.

Once the issuer receives the authorization request, it can approve or decline the transaction. If declined, a decline message can be sent back to the buyer. If authorized, the payment processing network can send an authorization log to a bank associated with the supplier. In exemplary embodiments, this authorization log is the first notice to this bank that such a transaction has been initiated by the buyer. The process of the issuer authorizing the transaction is called "authorization". The authorization step alerts the bank and the buyer that the transaction can go ahead. Payment generally occurs after the authorization step takes place. Payment occurs when funds transfer from the issuer to the supplier, or to the bank or other institution affiliated with the supplier.

Specific embodiments of the invention can be described with reference to FIGS. 1-5.

I. Exemplary Systems

FIG. 1 shows a system 20 according to an embodiment of the invention. Other systems according to embodiments of the invention may include fewer or more components than are specifically shown in FIG. 1.

FIG. 1 shows a buyer 30, an access device 34, a seller 22, an acquirer 24, a payment processing network 26, and an issuer 28, in operative communication with each other. The acquirer 24 and issuer 28 can communicate through the payment processing network 26. As described above, an "issuer" is typically a business entity (e.g., a bank) which maintains financial accounts for the buyer and often issues a portable consumer device such as a credit or debit card to the buyer. A "seller" is typically an entity that engages in transactions, such as a store, supplier, merchant, person, or service provider. The access device 34 is used by the buyer 30 to communicate with other parties in the system, and can comprise a computer, a telephone, or other communications means.

In a typical payment transaction, a buyer (i.e. the "payor") 30 may order goods or services from the seller 22. The buyer 30 can then send a payment instruction for the purchase using an access device 34. The access device 34 can transmit the payment instruction to the issuer 28 or directly the payment processing network 26. The payment processing network 26 can use identifying system 49 to parse the payment instruction to determine the identity of the proper seller. The payment processing network can then contact the issuer 28 associated with a payment account of the buyer 30, to receive either an authorization or a denial for the transaction. If the transaction is approved, the acquirer 24 is alerted, and funds are transferred between the proper parties.

As used herein, an "acquirer" is typically a business entity, e.g., a commercial bank that has a business relationship with a particular merchant or other entity. Some entities can perform both issuer and acquirer functions. Embodiments of the invention encompass such single entity issuer-acquirers.

The buyer 30 may be an individual, or an organization such as a business that is capable of purchasing goods or services.

The payment processing network 26 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server. The server computer may comprise a computer readable medium comprising code for processing transactions as detailed below, including code for receiving messages from merchants, acquirers, and issuers, code for generating unique transaction identifiers and associating them with specific transactions, code for sending messages, code for identifying issuers, and code for clearing and settling transactions and chargeback requests in substantially real time.

The server computer 44 may also comprise a computer readable medium comprising code for receiving a payment instruction message for making a payment using an account associated with an issuer, wherein the payment instruction contains at least partial payee information and further wherein the payment instruction message is originated by an entity different from the payee, code for reviewing the payment instruction message; code for determining substantially complete payee information; and code for sending an authorization request to the issuer, wherein the authorization request includes a push identifier.

The server computer 44 may also comprise code for receiving a payment instruction message, code for reading the payment instruction message and determining if the payment instruction message contains information to determine a payee, and code for using fuzzy logic matching to compare the information in the payment instruction message to multiple data stores to substantially identify a payee associated with the payment instruction, wherein the multiple data stores include a plurality of identifiers for at least one merchant, wherein the plurality of identifiers includes an identifier for a name, an identifier for a phone number, and an identifier for an address.

The payment processing network 26 may comprise or use a payment processing network such as VisaNet™ or Banknet™. The payment processing network 26 and any communication network that communicates with the payment processing network 26 may use any other suitable wired or wireless network, including the Internet. The payment processing network 26 may be adapted to process ordinary debit or credit card transactions, along with push payment transactions as contemplated herein.

The identifying system 49 can be used to determine the identity of the payee to a transaction, even when given only incomplete transaction information, as described in greater detail below. The identifying system 49 can comprise one or more server computers, one or more databases, or any suitable combination therein. In certain embodiments, the identifying system 49 can be a part of payment processing network 26, such that portions of the payment processing network 26 can perform some or all of the functions of identifying system 49. In alternative embodiments, the identifying system 49 can be a separate network or computer system in communications with payment processing network 26. In certain implementations, identifying system 49 can comprise multiple databases of information located on various independent computer systems in communications with each other.

Embodiments of the payment processing network 26 may also include, or separately communicate with, a data center hub that can accommodate multiple methods of payment ("MMOP"), not shown. The data center hub can perform profile management, file management, message translation, store and execute business rules, and interconnect with various other networks. Exemplary data center hubs are described in U.S. patent application Ser. No. 11/929,033, entitled "System and Method For Processing Multiple Methods of Payment," which is herein incorporated by reference in its entirety for all purposes. In certain embodiments, identifying system 49 can comprise such a data center hub.

Although the payment processing network 26 and identifying system 49 are illustrated as being operationally between an acquirer 24 and an issuer 28, they need not be in other embodiments of the invention. Either or both may include any suitable combination of computer apparatuses which can facilitate the processing described in this application.

The buyer 30 can use an access device 34 to communicate with the issuer 28 or payment processing network 26. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. The access device may comprise a convenient interface such as a web browser on a computer that communicates over the Internet. In certain embodiments, the buyer 30 may have a portable consumer device, such as a payment card, associated with accounts hosted by the issuer 28. In one aspect, the payment card can interact with the access device 34 to create a payment instruction message to send. In other aspects, the payment card can contain the relevant payment account information. The buyer can provide the relevant payment account information that is contained on the payment card to access device 34 or directly to either issuer 28 payment processing network 26.

The access device 34 may comprise a processor and a computer readable medium, wherein the computer readable medium comprises code for obtaining an account number associated with a consumer; code for sending an authorization request message comprising the account number and an amount for the transaction to a payment processing network; and code for receiving an authorization response message comprising a unique transaction identifier for the transaction.

For simplicity of illustration, one buyer 30, one seller 22, one access device 34, one acquirer 24, and one issuer 28 are shown. However, it is understood that in embodiments of the invention, there can be multiple consumers, portable consumer devices, merchants, access devices, acquirers, issuers, as well as server computers, databases, accounts, etc.

II. Exemplary Processes

Figure 2:
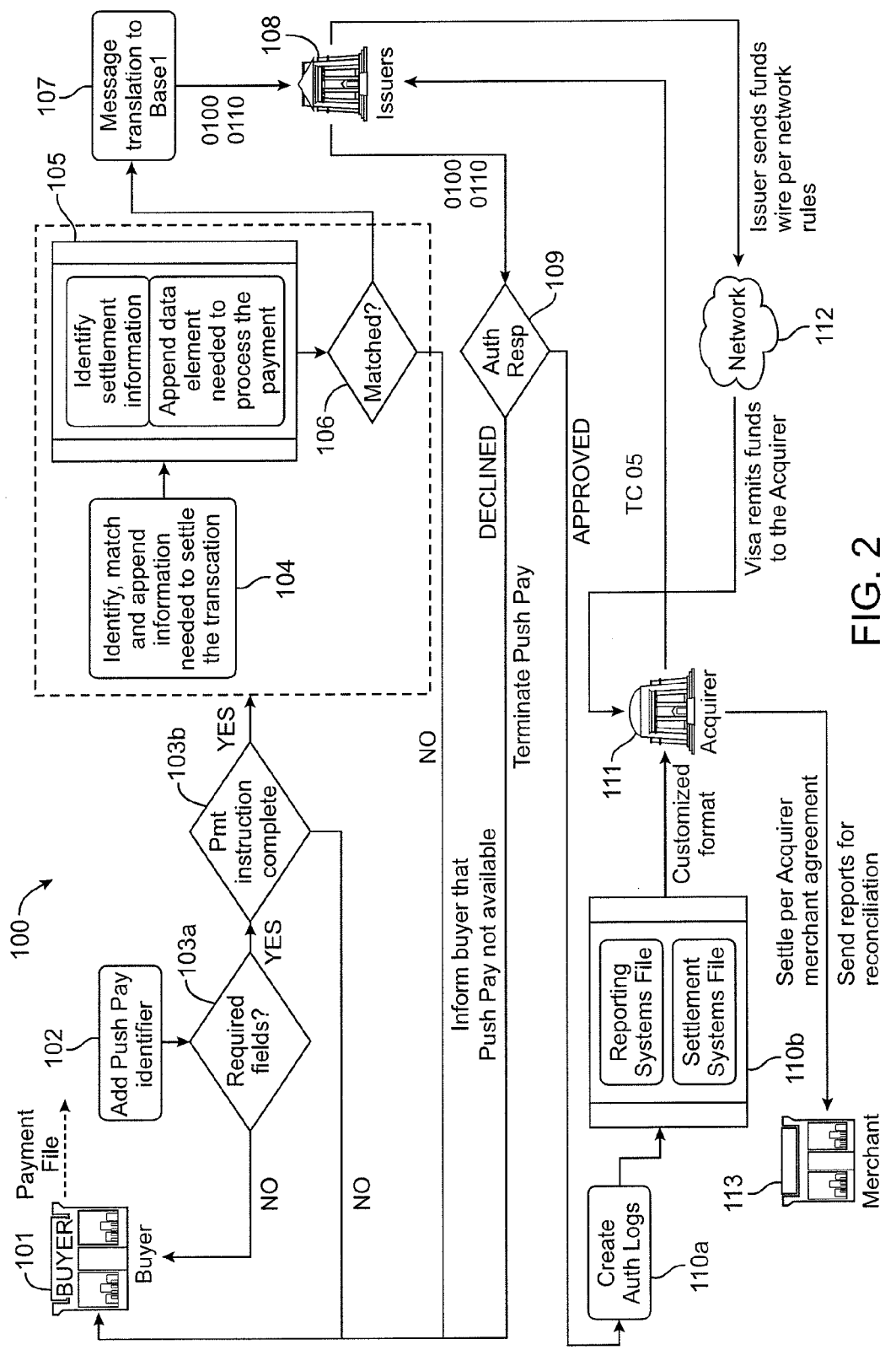
FIG. 2 is a flowchart illustrating a method according to an embodiment of the invention.

FIG. 2 provides a flow diagram of an exemplary transaction process 100 performed by the system 20 of FIG. 1. In certain embodiments, the transaction processes may differ, depending on the nature of the transaction and the specific parties involved.

In step 101, a buyer will initiate a transaction. As detailed above, the transaction can be a financial transaction in which the buyer/payor pays a merchant/payee for goods or services. This payment can be a bill payment, in response to an invoice, a purchase card transaction, or other suitable transaction. In certain embodiments, multiple payments to a specific merchant can be aggregated and paid in one transaction. To initiate a transaction, the buyer prepares a payment instruction message, or payment file. This payment instruction message will contain the minimum information necessary to process a transaction. In exemplary embodiments, the payment instruction message will contain at least the information on who to pay (payee information) and how much to pay for the transaction ("transaction amount"). In some embodiments, the payment instruction message can contain other information such as the time of payment, a related invoice number, a related purchase order number, what currency the transaction will be executed in, the name of the issuer and an identifier for the buyer's bank account with the issuer used in the transaction, etc.

In exemplary embodiments, the payment instruction message will contain partial payee information. Payment instruction messages will include data that is used to identify the payee. In exemplary embodiments used herein, "partial payment information" can refer to payee related data that is missing certain information, so that the data on its face could not identify the payee to 100% accuracy. Partial payee information may comprise any or all of the name of the payee, phone number, email or website information, address, and other identifiers (such as a tax identifier provided by a government, or a specific identifier assigned by a bank or payment processing network). However, the partial payee information can be missing payment information. The information may include an incomplete payee name, or an old or incorrect address. The partial payment information can also include unclear information, such as a name or address of a payee that is shared with multiple other organizations. Once the payment instruction message is received, the system 20 of FIG. 1 will analyze the payment instruction message to determine substantially complete payee information, as in steps 104-106. In exemplary embodiments, "substantially complete payee information" can comprise information on the payee to allow a payment to be made to the correct payee. For example, if the partial payee information includes an incomplete payee name and a wrong address, embodiments of the payment processing system 20 will determine the full payee name and correct address. In certain embodiments, substantially complete payee information can comprise an accuracy within a predetermined threshold. For example, substantially complete payee information may comprise the information on a payee to within 95% accuracy. Other embodiments contemplate higher or lower predetermined accuracies, such as 70%, 85%, or 99%. In comparison, when a transaction is initiated by a payee (such as a standard credit card transaction where a credit card is "swiped" at the payee/merchant), the payee information can be accurate to 100%. This is because the payee information is provided by the payee itself in standard transactions. Thus, in one aspect, substantially complete payee information is the information on the payee that is accurate enough to complete a transaction.

The buyer can initiate a transaction in step 101 in any number of sufficient ways. Embodiments contemplate that the payment instruction message can be created and transmitted by: proprietary software, and then submitted to the payment processing network by any transmission system such as file transfer protocol (FTP) or secure FTP, email, etc.; by written or oral instructions provided by phone, mail or in person; by a web-browser connected to a secure website; by merchant direct exchange (MDEX) systems; or any other suitable methods. Exemplary embodiments further contemplate that payment instruction messages can be generated by inputting the required information into files created by commonly available software programs such as Microsoft Word or Excel. In certain embodiments, the payment instruction message is directly transmitted to the payment processing network. In other embodiments, the buyer communicates a payment request to the buyer's bank (the issuer), which then transmits the payment instruction message to the payment processing network.

Once the payment instruction message has been sent to the payment processing network, a push identifier is added to the file in step 102. This push identifier will label the transaction as a push transaction. In exemplary embodiments, push transactions will utilize existing payment transaction infrastructure. The push identifier allows the existing systems to properly identify and process the push transaction as opposed to standard transactions, and allows the system to know to perform specific push-processing on the transaction when necessary. In steps 103a and 103b, the payment instruction message is analyzed to determine if the payment instruction is complete. In specific embodiments, the payment instruction can be complete when all required payment fields (such as partial payee name, amount to pay, etc) are provided and all other requirements for the payment instruction message are met, as determined by the payment processing network. If the payment instruction message is not complete as determined in step 103a or 103b, a notice message is sent to the buyer to request further payee identifying information, to create a complete payment instruction message. Further payee identifying information can comprise information related to the payee that was not previously provided in the payment instruction message, such as phone numbers, addresses, or alternative spellings of previously provided information.

If the payment instruction message is determined to be complete in steps 103a and 103b, the payment message is further validated and processed in steps 104-106. Steps 104-106 may be performed partly or entirely by the payment processing network 26 of FIG. 1. In certain embodiments, portions or the entirety of steps 104-106 may be performed by identifying system 49. In step 104, the payment instruction message is parsed to extract the partial payee information. As described above, the partial payee information will be translated into complete payee information. If the complete payee information has already been provided, then the payment instruction message is moved to step 105. In exemplary embodiments, the payment instruction message only contains partial payee information, and an exact match cannot be prima facie made to the proper payee. This may occur, for example, when the payee name is incorrectly spelled or missing information ("payee corp. is provided, but "the payee corp." is the full name). Also, various abbreviations may be provided in the partial payee information, such as "corp" or "co" for "corporation" or "rd" for "road". Partial information can also occur when multiple payees have the same name. For example, a contractor may purchase supplies from a Home Depot store. There are hundreds of Home Depot stores in the country, and the payment instruction message may not specify which specific store is to be paid. Furthermore, other portions of the payee information, other than related to the name, can have missing or incorrect information in the partial payee information provided in the payment instruction message. For example, a payee may be located in Albuquerque, N. Mex. However, "Albuquerque" may be misspelled in the partial payee information, such as "Alberquerque," or it may be incorrectly identified as being located in the state of New Jersey. There may also be abbreviations in the address, as stated above. In some examples, the only information provided may be the phone number of the payee. For every field provided in the payment instruction message by the buyer, there can be inconsistencies, missing, or incorrect information.

The process of matching information in step 104 can be a desirable part of embodiments of the invention. Embodiments of the identifying system 49 can look at the totality of information given. Thus, if the name provided does not match with the phone number, both can be compared to the address. In some embodiments, if two of those three data items match each other, and the third is within a predetermined deviation, a match can be considered to be made, and substantially complete payee information has been determined. For example, the following information may be included in data fields of a payment instruction message:

| | |
|---|---|
| Payee Name: | Payee Corp. |
| Payee Phone: | (800)-555-5555 |
| Payee Address: | 15 Lincoln Rd. |
| | Arlington, VA 22202 |

This information can comprise partial payee information. In step 104, systems, such as computer systems described with respect to FIG. 1, can extract the partial payee information from a payment instruction message, and analyze it. The data fields may be compared to various databases of entities stored or accessible by the identifying system 49. These databases can contain lists of payee names. In certain embodiments, one or more of these databases can contain listings of payees configured to accept payments through a payment processing network. Payee information compiled in the databases may be derived from transactions conducted with the payee from various payors. The transactions may include debit card transactions, credit card transactions, stored value transactions, etc. After comparison to the various databases, the identifying system may determine that there is no "Payee Corp." listed at the given address. An entity with the name "Payee Services International" is listed at the given address, and has the given phone number. Furthermore, it is determined that "Payee Corporation" is a wholly-owned subsidiary of "Payee Services International." Thus, substantially complete payee information will consist of "Payee Corporation" with the provided phone and address information.

In some embodiments, it is possible to build a database with partial and supplemental payee information so that future payment messages may be determined with greater accuracy and speed. It is also possible for various third parties to mine the database for such partial and supplemental payee information so that substantially complete payee information may be determined. A fee may be assessed by the party operating the data to the party requesting the data.

In other examples, there could be typographical errors or other incorrect information provided. The address may be provided as "13 Linkin Lane", or the phone number can be provided as "(888) 555-5555." The identifying system 49 can compare the partial payee information with various databases as described above. In exemplary embodiments, the identifying system 49 can also use fuzzy logic in determining substantially complete payee information. The identifying system 49 can use fuzzy logic matching to compare the partial payee information to single or multiple data stores containing listings of substantially complete payee information. Fuzzy logic comprises techniques for reasoning under uncertainty and has been widely used in modern industrial and consumer product control systems, as well as reporting systems. Fuzzy logic may generally be viewed as a superset of Boolean logic in which Boolean truth values may be replaced with intermediate degrees of truth. Thus, while Boolean logic allows only for truth values of zero and one, fuzzy logic allows for truth values having any real number between zero and one. In certain implementations, the identifying system 49 can be in communications with or otherwise have access to third party databases and matching systems, such as Dun & Bradstreet products including D&B MarketMatch. The identifying system 49 can also include other suitable processes such as a Hidden Markov Model (HMM), a dynamic programming model, a neural network, a template matcher, etc. These databases, techniques, and models may be used singly or in combination.

Identifying system 49 can use fuzzy logic matching, or other suitable systems. In the above example, the identifying system can use fuzzy logic to compare the phone number "(888) 555-5555" provided in the payment instruction message with various databases. The identifying system may determine, to 96% accuracy, that the substantially complete payee information comprises the phone number "(800) 555-5555". The accuracy can be compared to a predetermined accuracy threshold. This threshold can be set by the payment processing network, the payor, the issuer, the acquirer, or other parties related to push transactions according to embodiments disclosed herein. Identifying system 49 may have a predetermined accuracy threshold of 95%. In the above example, the substantially complete payee information is sufficiently accurate, and payment processing will continue at step 105. In other implementations, identifying system may have a predetermined threshold of 99%. In the above example, the substantially complete payee information is not sufficiently accurate. If no greater accuracy match can be made, transaction processing will stop at step 105 and a message will be sent to the buyer that push payment cannot be made without further payee identifying information.

Each data field provided in the partial payee information can be compared to appropriate databases and analyzed by fuzzy logic matching, as described above with respect to step 104. Various data fields may be weighted during analysis. For example, the name provided in the partial payee information may be given greater weight than the email address, or vice versa. Once all fields have been processed, both individually and in combination, substantially complete payee information is determined to the greatest accuracy possible. Then, in step 105, any further information that could be necessary in executing a transaction is determined, and appended to the payment instruction message. This can include payment routing information, network identifiers, etc. The payment processing system can also apply any risk assessment processes to the transaction, as is known in the art. In step 106, if the accuracy of the substantially complete payee information is greater than a predetermined threshold, the payment instruction message is translated and processed according to step 107. In certain embodiments, the accuracy needs to be greater than or equal to the predetermined threshold, whereas in other embodiments, the accuracy must be greater than the predetermined threshold.

The first time a buyer makes a push payment according to embodiments disclosed herein, matching of the partial payee information to substantially complete payee information may need to be performed as described above. Once substantially complete payee information is determined, the identifying system 49 can assign the payee a unique payee identifier, or "merchant identifier", to be used in future push payments. The identifying system 49 can also assign a buyer identifier to the buyer. This buyer identifier can be used to quickly identify who is making a push payment and the financial account that will be used. The merchant identifier and the buyer identifier can be sent to the buyer. The buyer can then use those payment processing network generated identifiers in future push payments for increased accuracy and faster transactions.

The identifying system 49 can also create or modify databases that correlate the merchant identifiers and the buyer identifiers with other given information. This can include identifiers that a buyer will internally assign to a vendor, and vice versa. For example, a Company X may often purchase computer supplies from Vendor Y. Company X may assign Vendor Y the id of "VY123," and Vendor Y may assign Company X the id of "CX-AB5." If either of these identifiers are provided in the payment instruction message that initiates the transaction (or otherwise known to the identifying system 49), the identifying system 49 can store the identifiers in a database, such as database 48. The database can map the identifiers to other identifying information. For example, the identifiers "VY123" and "CX-AB5" can each be mapped to a unique identifier assigned by the payment processing network, and also the name and address of the respective companies. Thus, when Company X initiates a push payment to make a payment to Vendor Y by using the identifier VY123, 100% accuracy can be achieved in determining the substantially complete payee information.

Referring to step 107, the payment instruction message (that contains the substantially complete payee information previously determined) is translated to the format of an authorization request. This authorization request message can be in the format used by a conventional credit card processing message. In certain implementations, the payment instruction message is translated into a Base 1 authorization request message as is known in the art. In conventional transactions, authorization request messages are generated by the payee/seller. However, in certain embodiments, the payment processing network creates the authorization request message of step 107, using information provided by the buyer and processed by the network. The translated authorization request message created in step 107 can contain all the required information to continue with the transaction, including substantially complete payee information, amount of the transaction, and which account the buyer will be using to make the payment. The authorization request message can be nearly identical to one created by conventional credit card processing. In exemplary embodiments, the authorization request message can be identical to conventional ones, except that the authorization request message created in step 107 can contain the push identifier generated in step 102.

The authorization request message can then be sent to the issuer in step 108 by the payment processing network. The issuer can be a bank that manages a bank account associated with the buyer. This bank account can contain the funds used in the payment transaction. In certain embodiments, the buyer has initiated the transaction through the issuer, which then contacts the payment processing network. In other embodiments, the buyer can specify the issuer in the payment instruction message. In step 109, the issuer determines whether the transaction is authorized (i.e., approved). The issuer may run certain risk system and other authorization processes, as is known in the art. The issuer may authorize the transaction if there is sufficient credit and/or funds in the buyer's account. The issuer may not authorize the transaction if there is insufficient credit or funds. Furthermore, the issuer may apply certain specialized processes for push payment requests (due to the push identifier within the message), such as providing special rewards or discounts.

If the transaction is declined, the transaction terminates and a decline message is sent to the payment processing network, which forwards the message to the buyer. If the transaction is authorized, the issuer will alert the payment processing network. An authorization response message containing an authorization log is created in steps 110a and 110b. This authorization log can be created by payment processing network, or by the issuer and forwarded to the payment processing network. The authorization log can contain reporting and settlement data as is known in the art, such as a reporting systems file and a settlement file. The authorization log can also be augmented with further information for push transactions, such as including the push identifier. The authorization log may also include information on the underlying transaction such as the related invoice number, the related purchase order number, and the name of the buyer. In certain implementations, the authorization log can be customized to conform to requirements by specific acquirers. The authorization response message (including the authorization log) is received by the acquirer in step 111. In exemplary embodiments, the authorization response message is the first notification the acquirer has regarding the transaction. The authorization response message can function as an alert to the acquirer that a payment will be made, from the buyer to the payee. Thus, in some embodiments the acquirer may only be contacted after a transaction has been authorized by the issuer (i.e., the authorization request message is sent to the issuer before initiating any communications with the acquirer). This increases transaction speed and efficiency, as the acquirer is involved in fewer steps of the transaction, and does not process transactions that are ultimately terminated without authorization.

After the transaction is approved, a normal clearing and settlement process can take place. The acquirer will send a reconciliation message (e.g., a reconciliation report) regarding funds flow to the payment processing network, which will then forward the message to the issuer. This reconciliation message can contain payor information (such as the buyer name), the invoice number, and the purchase order number. The acquirer will also send the reconciliation message to the merchant in step 113. In step 112, funds will be remitted from the buyer's financial account with the issuer to the acquirer. In certain embodiments, the issuer can send funds relating to the transaction to the payment processing network. The payment processing network can then remit the funds to the payee, or to an account associated with the payee (such as an account with the acquirer). In certain embodiments, the reconciliation message can be sent to the payee at the same time as the funds are remitted. The payee's account that is associated with the acquirer will then grow by the amount of funds used to pay for the underlying transaction, minus any applicable fees. The buyer's account associated with the issuer will be decreased by the same amount of funds, plus any applicable fees. By this method, money can be transferred. This funds flow can reference the information in the reconciliation message, so all parties can know the purpose of the money flow and the corresponding transaction information. Thus, by the method described above, a buyer is able to "push" a payment to a merchant. This allows the buyer to have greater control over payment methods and scheduling compared to conventional payment methods. Furthermore, systems and processes for credit card processing transactions can be leveraged. This can provide all the advantages of a credit card transaction in a push model, such as for purchase order payments. Advantages include greater security and fraud protection, risk assessments performed in real time or near real time during processing, the ability to access rewards programs such as cumulative point refunds, etc. Furthermore, embodiments of the systems and methods described above also improve on existing credit card transactions by using an enhanced process flow that may only engage acquirers after a payment has been authorized. Embodiments contain these and other advantages, as will be described in greater detail below.

Figure 3:
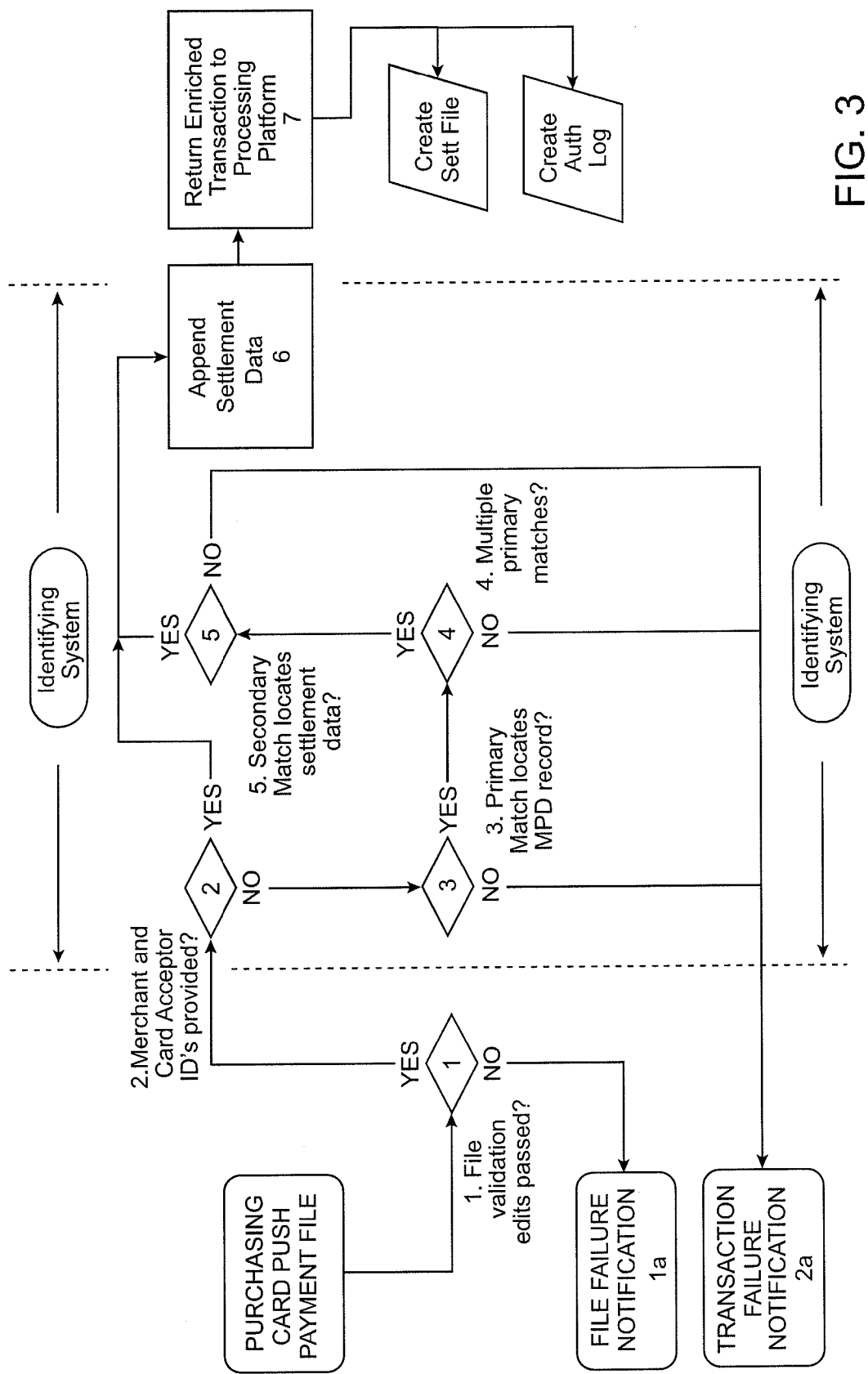
FIG. 3 is a flowchart illustrating a method according to an embodiment of the invention.

FIG. 3 shows an embodiment of a push transaction, with emphasis on the matching process for determining substantially complete payee information. In this embodiment, a payment instruction message is prepared by a buyer as disclosed above, and received by a payment processing network, such as a server computer shown in FIG. 1. In step 1, the payment processing network 26 can review (i.e., "validate") the payment instruction message to determine if all required information is present, such as partial payee information. If the payment instruction message is missing critical information, the transaction will not proceed, as shown in step 1a. If the payment instruction message is validated, it is sent to an identifying system 49 to determine the payee. In step 2, the identifying system 49 parses (i.e., reviews) the payment instruction message to determine if the message contains a buyer identifier and if the partial payee information includes a merchant identifier. Embodiments of these identifiers are described above in relation to FIG. 2. In certain embodiments, these identifiers are stored in databases within the identifying system 49, and are confirmed to each map to a specific, unique entity. Thus, when given a merchant identifier and a buyer identifier, the identifying system 49 can determine to nearly or fully complete (100%) accuracy the substantially complete payee information. The payment processing network 26 can then append any necessary information to create an authorization request message in step 6, and then process the authorization request message on conventional means in step 7 (i.e., authorization, settlement, and clearance).

If the payment instruction message does not contain at least a merchant identifier, the identifying system (which can comprise a server computer) will then proceed to analyze the partial payee information provided to determine substantially complete payee information. The partial payee information can be compared to various databases in step 3, to determine if the information matches, based on predetermined criteria, a payee record stored by the identifying system. If there is no match, a transaction failure message is sent to the buyer in step 2a. In exemplary embodiments, fuzzy logic matching can be used. If there is a match, the partial payee information is analyzed, in step 4, to determine if there is more than one matching record. In certain embodiments, only a single match is required, and the transaction can continue with step 6 if no further records are found in step 4. In other exemplary embodiments, the partial payee information must be matched to more than one record stored in a database accessed by identifying system 49. Thus, in these embodiments of step 4, if no further records match the partial payee information, transaction failure message is sent to the buyer in step 2a.

If more than one matching record is found, all matching records can be compared to determine the most accurate one. In one implementation, the identifying system 49 can rank various data fields of the matching records by importance, and the matching record with the highest ranked matching data fields can be chosen. For example, the matching record may contain data fields for a merchant's tax identifier, a merchant name, an address, and a zip code. The identifying system may rank field by importance. Thus, the tax identifier field may be most important, the name second, the address third, and the zip fourth.

In one case, the identifying system may determine 3 records that match, to at least some degree, partial payee information given as: FredCo, 15 Broadlawn Drive, Ohio, 11111, with no tax identifier provided. The first matching record may be an exact match on the zip code, match the street address but not the street number (e.g., 12 Broadlawn Drive), and may not match the merchant name provided in the partial payment information. The second matching record may match the merchant name, may match the address to within a predetermined allowed deviation (e.g. 15 Broadlawn Dr., Ohio), and may match the zip code. The third matching record may not match either the name or the zip code, but match on the address. In the example given above, the second matching record would contain the most highly ranked matching data fields, and would be the matching record chosen.

In step 5, the chosen matching record could be analyzed to determine the accuracy and settlement data can be determined. If the accuracy is below a predetermined threshold, a transaction failure message is sent to the buyer in step 2a. If the accuracy is above the predetermined threshold, then substantially complete payee information has been determined. Settlement data can be determined for the payee identified by the substantially complete payee information. Settlement data can include information such as contact information for the acquirer associated with the payee. This settlement data can be combined with the payment request message, the substantially complete payee information, and a push identifier to create an authorization request message in step 6. Processing as described above can then take place to complete the transaction.

III. Portable Devices and Computer Apparatuses

Figure 4A:
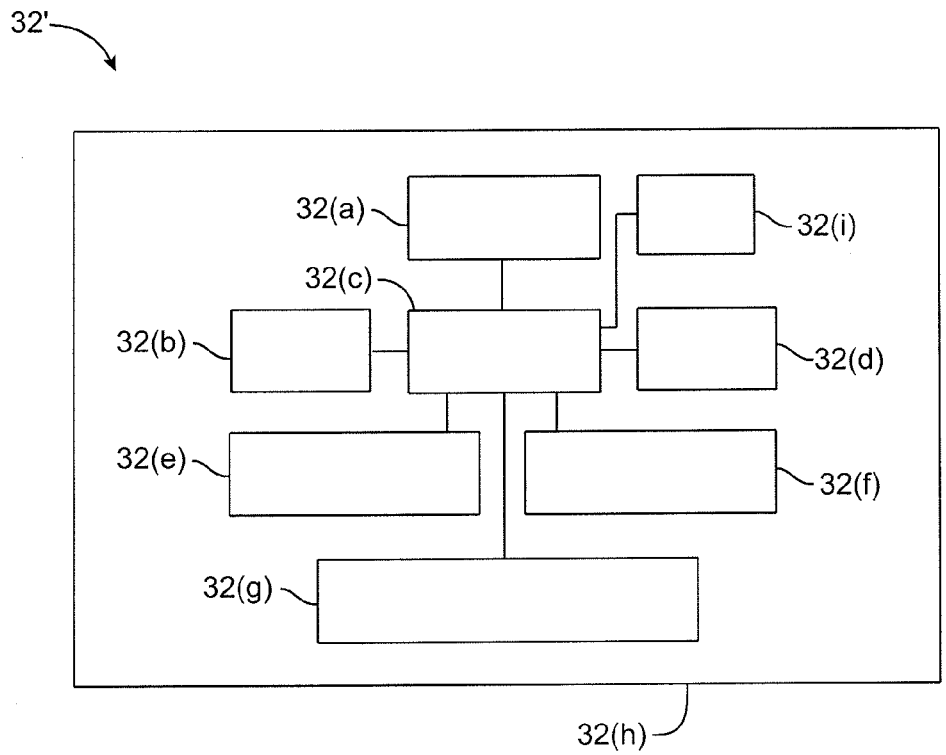
FIGS. 4(a)-4(b) show block diagrams of portable consumer devices.
Figure 4B:
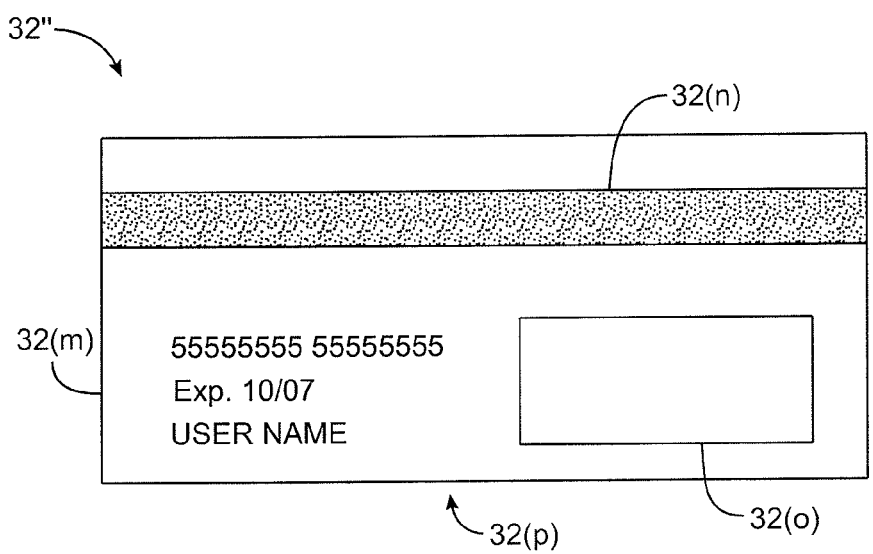

FIGS. 4(a)-4(b) show block diagrams of portable consumer devices and subsystems that may be present in computer apparatuses in systems according to embodiments of the invention.

The portable consumer device that is used in embodiments of the invention may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor) such as payment cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a phone may comprise a computer readable medium and a body as shown in FIG. 4(a). (FIG. 4(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, encryption algorithms, private or private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(*i*) to allow the consumer to transmit her voice through the portable consumer device 32'. The portable consumer device 32' may also include an antenna 32(*a*) for wireless data transfer (e.g., data transmission).

Portable consumer device 32' may be used by a buyer to initiate push payments. In some implementations, portable consumer device 32' can include an interface to allow the buyer to create a payment request message. The portable consumer device 32' can then send the payment request message to a payment processing network using contactless element 32(*g*) or over a wireless or wired communications.

An example of a portable consumer device 32" in the form of a card is shown in FIG. 4(*b*). FIG. 4(*b*) shows a plastic substrate 32(*m*). A contactless element 32(*o*) for interfacing with an access device 34 may be present on or embedded within the plastic substrate 32(*m*). Consumer information 32(*p*) such as an account number, expiration date, and consumer name may be printed or embossed on the card. Also, a magnetic stripe 32(*n*) may also be on the plastic substrate 32(*m*).

As shown in FIG. 4(*b*), the portable consumer device 32" may include both a magnetic stripe 32(*n*) and a contactless element 32(*o*). In other embodiments, both the magnetic stripe 32(*n*) and the contactless element 32(*o*) may be in the portable consumer device 32". In other embodiments, either the magnetic stripe 32(*n*) or the contactless element 32(*o*) may be present in the portable consumer device 32". In some implementations, portable consumer device 32" can comprise a purchase card. Purchase card 32" can include a buyer identifier associated with the buyer, an account number associated with an account controlled by the buyer and used for payments, or other identifying information. This identifying information can be used by the buyer when creating payment instruction messages, as described above.

Figure 5:
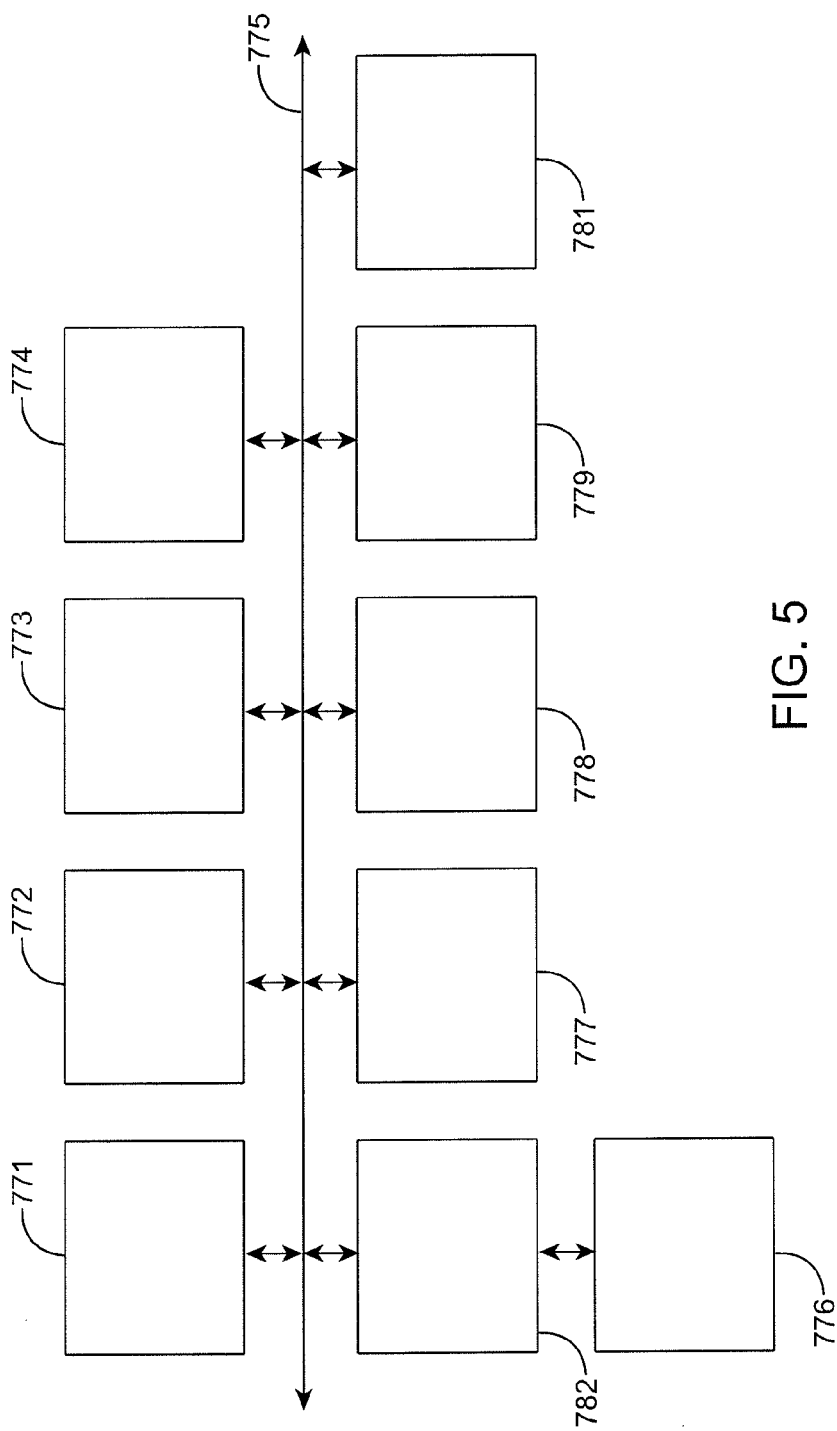
FIG. 5 shows a block diagram of a computer apparatus.

The various participants and elements in FIG. 1 may operate or use one or more computer apparatuses to facilitate the functions described herein. Any of the elements in FIG. 1 (e.g., the access device 34, the merchant 22, the acquirer 24, etc.) may use any suitable number of subsystems to facilitate the functions described herein. Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Embodiments of the invention contain a number of advantages. In certain implementations, the beneficiary of the payment transaction (i.e., the payee) does not need to register or opt-in to any systems. A payor may push a payment to any entity that is already capable of accepting a payment, such as by credit card or other means. Further, the payor retains control over the amounts and timing of the transaction. The payee and associated entities (such as the acquirer) do not need to be troubled with transactions that are not ultimately issuer-approved, which increases system efficiencies and prevents waste. All parties in the transaction may have access to increased fraud and risk detection, as well as rewards and other benefits programs.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A computer implemented method for conducting a transaction, comprising:

receiving a payment instruction message at a server computer, wherein the payment instruction message comprises information for use in making a payment to a payee using an account associated with an issuer, wherein the payment instruction message contains at least partial payee information and further wherein the payment instruction message is originated by an entity different from the payee;

reviewing at the server computer the payment instruction message;

identifying the transaction as a push transaction and providing a push identifier;

determining at the server computer substantially complete payee information based on the received partial payee information; and in response to determining substantially complete payee information, sending by the server computer an authorization request message to the issuer after reviewing the payment instruction message, wherein the authorization request message includes the push identifier.

2. The computer implemented method of claim 1, wherein the payment instruction message is originated by a payor.

3. The computer implemented method of claim 2, further comprising notifying the payor that the transaction cannot be completed without further payee identifying information, prior to sending the authorization request message.

4. The computer implemented method of claim 1, further comprising:
  receiving an authorization response message for the transaction from the issuer; and
  sending an authorization log to an acquirer associated with the payee.

5. The computer implemented method of claim 4, wherein the authorization request message is sent to the issuer before communicating with the acquirer.

6. The computer implemented method of claim 1, further comprising:
  prior to sending the authorization request message, appending the push identifier to the payment instruction and translating the payment instruction into a Base I message, wherein the authorization request comprises the Base I message.

7. The computer implemented method of claim 1, wherein the determining substantially complete payee information includes determining the payee to an accuracy of at least a predetermined threshold.

8. The computer implemented method of claim 7, wherein the predetermined threshold comprises 85%.

9. The computer implemented method of claim 1, wherein the determining substantially complete payee information comprises using fuzzy logic to match information in the payment instruction message with one or more lists of payee names in one or more databases.

10. The computer implemented method of claim 9, wherein the one or more databases include database listings of payees configured to accept payments through a payment processing network.

11. A computer implemented method of making a payment, comprising:
  sending a payment instruction message including at least partial payee information, transaction amount, and time of payment corresponding to a transaction to a server computer, wherein the payment instruction message is parsed by the server computer to determine substantially complete payee information and an authorization log is sent to an acquirer associated with the payee, wherein the server computer further identifies the transaction as a push transaction and includes a push identifier in an authorization request message; and
  transferring funds to the payee.

12. The computer implemented method of claim 11, wherein the at least partial payee information includes a name of the payee.

13. The computer implemented method of claim 11, wherein the at least partial payee information includes a phone number of the payee.

14. A non-transitory computer readable medium for conducting push transactions, comprising:
  code for receiving a payment instruction message comprising information for use in making a payment using an account associated with an issuer, wherein the payment instruction contains at least partial payee information and further wherein the payment instruction message is originated by an entity different from a payee;
  code for reviewing the payment instruction message,
  code for identifying a transaction as a push transaction;
  code for generating a push identifier based on the identification of the push transaction;
  code for determining substantially complete payee information; and
  code for sending an authorization request to the issuer, wherein the authorization request includes the push identifier.

15. The computer readable medium of claim 14, wherein the determining substantially complete payee information comprises determining the payee to an accuracy of at least a predetermined threshold.

16. The computer readable medium of claim 15, wherein the predetermined threshold comprises 85%.

17. A non-transitory computer readable medium for identifying a payee in a transaction, comprising:
  code for receiving a payment instruction message;
  code for reviewing the payment instruction message and determining if the payment instruction message contains information to determine a payee;
  code for identifying the transaction as a push transaction;
  code for generating a push identifier based on the identification of the push transaction;
  code for using fuzzy logic matching to compare the information in the payment instruction message to multiple data stores to substantially identify a payee associated with the payment instruction,
  wherein the multiple data stores include a plurality of identifiers for at least one merchant, wherein the plurality of identifiers includes an identifier for a name, an identifier for a phone number, and an identifier for an address; and
  code for sending an authorization request to an issuer, wherein the authorization request includes the push identifier.

18. The method of claim 1 wherein the partial payee information comprises only a portion of the payee's name.

19. The method of claim 2 wherein the partial complete payee information comprises only a portion of the payee's address.

20. The method of claim 1 wherein the partial payee information comprises an abbreviation associated with the payee.

21. The method of claim 1 wherein the partial payee information comprises an incorrect spelling of the payee or information associated with the payee.

* * * * *